US012429200B2

(12) United States Patent
Su et al.

(10) Patent No.: US 12,429,200 B2
(45) Date of Patent: Sep. 30, 2025

(54) LIGHTING APPARATUS

(71) Applicant: LEEDARSON LIGHTING CO., LTD., Fujian (CN)

(72) Inventors: Siyuan Su, Fujian (CN); Chenghua Zeng, Fujian (CN); Junjie Lin, Fujian (CN); Tiansong Lan, Fujian (CN); Jiansheng Zhang, Fujian (CN); Haiyan Chen, Fujian (CN)

(73) Assignee: LEEDARSON LIGHTING CO., LTD., Zhangzhou (CN)

( * ) Notice: Subject to any disclaimer, the term of this patent is extended or adjusted under 35 U.S.C. 154(b) by 0 days.

(21) Appl. No.: 18/892,515

(22) Filed: Sep. 22, 2024

(65) Prior Publication Data

US 2025/0102136 A1 Mar. 27, 2025

(30) Foreign Application Priority Data

Sep. 22, 2023 (CN) ......................... 202322592095.8

(51) Int. Cl.

| | |
|---|---|
| ***F21V 21/112*** | (2006.01) |
| ***F21V 21/08*** | (2006.01) |
| ***F21V 23/06*** | (2006.01) |
| ***F21V 33/00*** | (2006.01) |
| ***F21Y 115/10*** | (2016.01) |

(52) U.S. Cl.

CPC ............ *F21V 21/112* (2013.01); *F21V 21/08* (2013.01); *F21V 23/06* (2013.01); *F21V 33/0056* (2013.01); *F21Y 2115/10* (2016.08)

(58) Field of Classification Search

CPC ........ F21V 21/112; F21V 21/08; F21V 23/06; F21V 33/0056

See application file for complete search history.

(56) References Cited

U.S. PATENT DOCUMENTS

| | | | | |
|---|---|---|---|---|
| 10,041,639 | B1 * | 8/2018 | Thompson | F21S 9/02 |
| 10,240,731 | B2 * | 3/2019 | Ticktin | F21V 29/83 |
| 10,989,400 | B2 * | 4/2021 | Kohen | F21V 23/06 |
| 11,493,191 | B1 * | 11/2022 | Hand | F16B 45/023 |
| 2017/0146181 | A1 * | 5/2017 | Chen | F16C 11/045 |
| 2020/0363051 | A1 * | 11/2020 | Ma | F21V 29/10 |

* cited by examiner

*Primary Examiner* — Matthew J. Peerce
(74) *Attorney, Agent, or Firm* — LANWAY IPR SERVICES; Chun-Ming Shih

(57) ABSTRACT

A lighting apparatus includes a light module, a fixing member, a hanging member and an elastic member. The fixing member is fixedly connected to the light module. The fixing member is provided with a side slot. The hanging member is provided with a shaft. The hanging member further includes a hook. The shaft is inserted into the side slot from a side. The shaft is configured to rotate to be in a first state or a second state within the side slot. In the first state the hook is in a vertical position. In the second state the hook is in a horizontal position. The elastic member is fixedly provided on the light module. The elastic member is configured to push upward and press tightly against the shaft to maintain the shaft in the first state or the second state.

17 Claims, 17 Drawing Sheets

LIGHTING APPARATUS

FIELD

The present invention is related to a lighting apparatus, and more particularly related to a lighting apparatus used in industrial environment.

BACKGROUND

Light-emitting diodes, or LEDs, have come a long way since their invention in the 1960s. Initially limited to small indicator lights in electronics due to their low brightness and narrow color range, LEDs have evolved dramatically. Advances in materials and manufacturing processes have made LEDs more efficient, capable of producing brighter light across a wide range of colors, from cool whites to warm hues. The shift from incandescent and fluorescent lighting to LEDs has transformed many industries and homes, primarily due to the energy efficiency and longevity LEDs offer compared to traditional light sources.

One of the most significant areas where LEDs have made a noticeable impact is in consumer electronics. From backlighting in televisions and smartphones to indicators on gadgets, LEDs are widely integrated into everyday devices. Their small size, durability, and low power consumption make them ideal for these applications. Additionally, the use of LED screens has drastically improved display clarity and resolution, offering deeper blacks and brighter colors, which is especially evident in OLED (Organic LED) displays.

In the realm of residential and commercial lighting, LEDs have revolutionized how spaces are illuminated. LED bulbs consume far less energy than their incandescent counterparts, and they last significantly longer, reducing the need for frequent replacements. They are also more versatile, allowing for features such as dimming, color temperature adjustments, and smart home integration. As a result, LEDs have become the standard choice for modern lighting solutions in homes, offices, and public spaces.

The automotive industry has also embraced LED technology for various applications. From headlights and taillights to interior cabin lighting, LEDs are now the go-to choice for manufacturers. LEDs offer quicker response times, which is crucial for brake lights, and they provide better visibility for headlights due to their brightness and directivity. Moreover, their ability to operate in a wide range of temperatures makes them ideal for outdoor automotive use in diverse weather conditions.

In public infrastructure, LEDs have become a key component in street lighting and traffic signals. Many cities have retrofitted their streetlights with LED systems to reduce energy consumption and maintenance costs. LEDs also offer improved visibility for drivers and pedestrians, as they can be directed more precisely, minimizing light pollution and focusing illumination where it is needed. Traffic signals benefit from the longevity and reliability of LEDs, ensuring that they function properly without frequent maintenance or replacement.

The entertainment industry has also benefited from the development of LED technology, particularly in stage lighting and displays for concerts, theaters, and live events. LED lights allow for dynamic color changes and patterns that can be synchronized with music and other effects, enhancing the visual experience. The introduction of large-scale LED video walls has transformed stage designs, allowing for creative backdrops and digital environments that were previously impossible with traditional lighting setups.

In addition to entertainment, LEDs have become an essential tool in the medical field. From surgical lighting to specialized devices for treating certain medical conditions, LEDs are used due to their precision, low heat emission, and long lifespan. For instance, certain wavelengths of LED light are employed in phototherapy to treat skin conditions, while others are used in diagnostic equipment and operating room illumination.

One of the more recent trends in LED development is their integration into agricultural technology. LEDs can be used in indoor farming to provide specific wavelengths of light that optimize plant growth. By tailoring the spectrum of light, indoor farms can ensure that plants receive the optimal amount of energy for photosynthesis, leading to faster growth rates and higher yields. Additionally, LED systems in agriculture reduce the energy consumption compared to traditional lighting methods used in greenhouses.

The growing popularity of LED technology in the realm of smart lighting has also been notable. LED systems can now be integrated with home automation platforms, allowing users to control the lighting in their homes via smartphones, voice commands, or sensors. These systems offer not just convenience but also energy-saving features, such as automatic dimming or switching off lights when a room is unoccupied. The combination of LEDs with smart home technology exemplifies how modern advancements continue to shape how lighting is used in daily life.

Despite these wide applications, LED technology is still under continuous development. Researchers and engineers are exploring ways to make LEDs even more efficient and adaptable to specific needs, such as improving color rendering for specialized lighting applications or developing LEDs that can operate at even higher temperatures. Another area of focus is the miniaturization of LEDs, which could lead to breakthroughs in wearable technology and microdisplays. As demand grows for tailored lighting solutions across different industries, LEDs are poised to meet these evolving requirements.

In industrial environments such as tunnel construction, basements, factories, and building sites, lighting devices play a crucial role in ensuring the safety and productivity of workers. These environments often require robust and durable lighting solutions capable of withstanding harsh conditions such as dust, moisture, vibrations, and extreme temperatures. LED technology has become a popular choice for these applications due to its high light intensity, energy efficiency, and ability to operate in tough environments. Unlike traditional bulbs, which can fail under rough conditions, industrial-grade LED lights are built to last, providing consistent illumination even in the most challenging settings.

One of the primary concerns in these industrial scenarios is worker safety. Proper illumination is critical for preventing accidents, allowing workers to see hazards and perform their tasks accurately. In tunnels or construction sites, where visibility can be compromised by dust or debris, high-intensity LED lights ensure that the work area is well-lit. Additionally, many industrial lighting devices come with safety features such as shatterproof casings, waterproof designs, and anti-glare coatings to minimize the risk of injury from broken lights or excessive brightness. By meeting these stringent safety standards, these lighting solutions help protect workers and reduce the likelihood of workplace accidents.

There is still room for innovation in industrial lighting to further enhance safety and efficiency. For example, smart lighting systems could be developed to automatically adjust brightness based on the specific task or environment, conserving energy while still maintaining optimal visibility. Innovations in portable, rechargeable lighting devices could also make it easier to provide adequate lighting in remote or temporary locations without a reliable power source. Investing in these technological advancements would not only improve the safety and well-being of workers but also reduce energy consumption and operational costs, bringing long-term benefits to industries and the communities they serve.

SUMMARY

In some embodiments, a lighting apparatus includes a light module, a fixing member, a hanging member and an elastic member.

The fixing member is fixedly connected to the light module.

The fixing member is provided with a side slot. The hanging member is provided with a shaft. The hanging member further includes a hook. The shaft is inserted into the side slot from a side. The shaft is configured to rotate to be in a first state or a second state within the side slot.

In the first state the hook is in a vertical position. In the second state the hook is in a horizontal position.

The elastic member is fixedly provided on the light module. The elastic member is configured to push upward and press tightly against the shaft to maintain the shaft in the first state or the second state.

In some embodiments, a limiting groove is provided on a top slot wall of the side slot.

A limiting block is provided on a side of the shaft. The limiting block is shaped to match the limiting groove. In the first state the limiting block is located within the limiting groove.

In some embodiments, slot walls on both sides of the limiting groove in the side slot are arc-shaped inner walls.

The shaft is configured to press down the elastic member to disengage the limiting block from the limiting groove.

The shaft is configured to rotate to the second state and during rotation the limiting block moves in contact with the arc-shaped inner walls.

In some embodiments, the elastic member includes a spring seat and a first spring provided within the spring seat.

The spring seat is threadedly connected to the light module.

An exposed end of the first spring outside the spring seat is configured to contact the shaft.

In some embodiments, the elastic member includes a pushing seat, a pushing seat, a second spring and a pressure plate.

The pushing seat is configured to move along a height direction of the side slot.

A top of the pushing seat is configured to contact the shaft, a second spring.

The second spring is vertically arranged and a top end of the second spring is configured to push the pushing seat upward, a pressure plate. The pressure plate is fixedly provided. The pressure plate is configured to support a lower end of the second spring.

In some embodiments, the hanging member further includes an inverted U-shaped frame.

The hook is connected to the U-shaped frame. The shaft is provided on an inner wall of each of two opposite side bars of the U-shaped frame.

In some embodiments, the side slot is provided on two opposite sides of the fixing member.

Two shafts are provided on the hanging member. The two shafts are spaced apart and coaxially arranged opposite to each other. Each shaft is inserted into the side slot on the corresponding side.

In some embodiments, a columnar through-hole is provided on the fixing member.

An insertion post is provided on the light module. The insertion post is inserted into the through-hole to position the fixing member. The fixing member is fixedly connected to the light module by screws.

In some embodiments, a reinforcing plate is connected between the U-shaped frame and the hook.

The reinforcing plate is triangular. A surrounding frame is rotatably provided on the reinforcing plate.

The surrounding frame is configured to block a gap between the U-shaped frame and a hook head of the hook. The surrounding frame is positioned and engaged on the hook head with the aid of a torsion spring.

In some embodiments, the light module includes a driver module, a light housing and a light source.

A bottom side of the driver module is coupled to a top surface of the light housing.

The light housing has a light container for placing the light source.

In some embodiments, the driver module is detachable from the light housing. The fixing member is fixed to the light module.

In some embodiments, the light housing has a track for inserting the light module.

A lock is manually operated to lock the drive module to the light housing when the light module is sliced to a predetermine lock position.

In some embodiments, the fixing member has a dragging structure for changing a total length of the fixing member.

When the light module is dragged to carry the fixing member, the fixing member changes the total length under a dragging force, and.

When the dragging force disappears, the dragging structure is kept at the total length.

In some embodiments, the fixing member has a rotation structure for changing a rotation angle of the light module relative to the hanging member.

In some embodiments, a controller of the light module adjusts light parameter of a light source of the light module according to the rotation angle.

In some embodiments, the light module has a socket for detachably plugging an assistant light module.

The assistant light module has a battery charged via the light module via the socket.

In some embodiments, the assistant light module automatically turns on when the socket stops providing power.

In some embodiments, the assistant light module has a gas sensor for detecting harmful gas.

In some embodiments, the assistant light source has a magnetic structure to quickly attach to the socket and easily to be detached from the light module.

In some embodiments, the assistant light module has a position speaker.

The position speaker has a position switch to configure a position information.

When the position speaker is turned on, the position speaker generates a sound corresponding to the position information calling for help.

DETAILED DESCRIPTION

Figure 14:
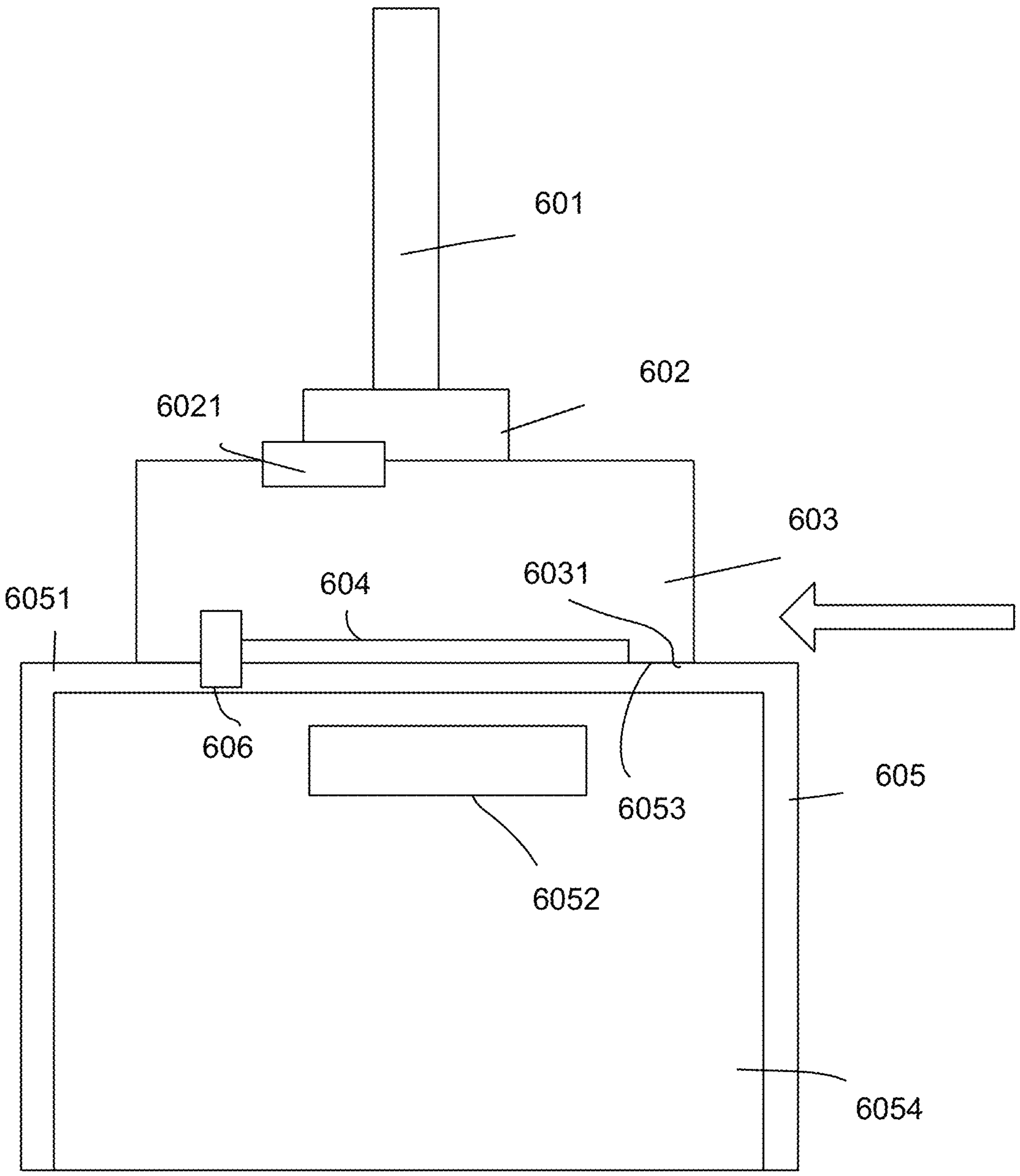
FIG. 14 illustrates another embodiment of a lighting apparatus.

In FIG. 14, a lighting apparatus includes a light module 605, a fixing member 603, a hanging member 601 and an elastic member 6021.

The fixing member 602 is fixedly connected to the light module 605.

The fixing member 602 is provided with a side slot. The hanging member is provided with a shaft. The hanging member further includes a hook. The shaft is inserted into the side slot from a side. The shaft is configured to rotate to be in a first state or a second state within the side slot. Following examples show more detailed examples.

For lighting fixtures that require suspension, especially industrial and mining lamps, the most common method currently on the market is to attach stainless steel hanging rings to the fixtures. These rings are installed on the lamps and are fixed in place after installation. However, this creates a problem because the hanging rings have a certain volume and remain in a vertical position, occupying space. As a result, the overall lighting fixture not only incurs high packaging costs but also takes up space, leading to reduced cabinet loading capacity and higher logistics and transportation costs. Therefore, these hanging rings are generally not pre-installed and require the client to install them afterward, which is also inconvenient.

Please refer to FIGS. 1-9. This application provides a specific implementation of a lighting apparatus. The lighting apparatus in this implementation includes a fixing member 1, a hanging member, and an elastic member.

The fixing member 1 is fixedly connected to the light module, and the fixing member 1 has a side slot 2.

The hanging member is equipped with a shaft 3, and the hanging member also includes a hook 4. The shaft 3 is inserted into the side slot 2 from the side. The shaft 3 can be rotated to achieve two states within the side slot 2: a first state and a second state. In the first state, the hook 4 is in a vertical position, and in the second state, the hook 4 is in a horizontal position.

The elastic member is fixedly installed on the light module and is used to push upwards and press tightly against the shaft 3 to keep it in either the first state or the second state.

Specifically, the fixing member 1 is part of the lighting apparatus provided in this implementation. It is not part of the light module itself. Its function is to connect with the hanging member through a specific shape, thereby enabling the hook 4 to achieve both vertical and horizontal positions.

The fixing member 1 provided in this implementation is fixedly connected to the light module. On the side of the fixing member 1, there is a side slot 2. The side slot 2 is a recessed groove on the side of the fixing member 1, and this groove extends through the bottom surface of the fixing member 1, meaning there is no groove wall on one side of the bottom surface of the fixing member 1.

The hanging member has a shaft 3, which enters the side slot 2 from the side, meaning the axis of the shaft 3 is perpendicular to the bottom surface of the side slot 2.

Two side slots 2 can be created, located on two opposite sides of the fixing member 1. Correspondingly, two shafts 3 can be set up, each entering the side slot 2 on the corresponding side, forming a clamping effect on the fixing member 1. When assembled, the end faces of both shafts 3 abut the bottom surface of the side slot 2, maintaining a certain clamping force.

The states of the shaft 3 include the first state and the second state. In the first state, the hook 4 is in a vertical position, and in the second state, the hook 4 is in a horizontal position. The switch between the first state and the second state of the shaft 3 is achieved through rotation, which simultaneously rotates the hook 4. The rotation angle can specifically be 90 degrees.

The function of the elastic member is to push against the shaft 3, pressing it tightly against the inner wall of the side slot 2, thereby keeping it in either the first state or the second state. This maintains the stability of the hook 4's position. When external force is applied to the shaft 3, it can overcome the elastic force, thus achieving the state switch.

Therefore, the beneficial effect of the lighting apparatus provided in this implementation is that in the first state, the hook 4 is in a vertical position, and in the second state, the hook 4 is in a horizontal position. When packaging and transportation are required, the hook 4 can be placed horizontally, thus reducing occupied space, increasing container loading capacity, and saving costs. When use is required, the hook 4 can be placed in a vertical position. The operation is simple, convenient, and quick. Moreover, whether in the vertical or horizontal position, the pushing of the elastic member can stably maintain the current state, providing good stability.

Figure 3:
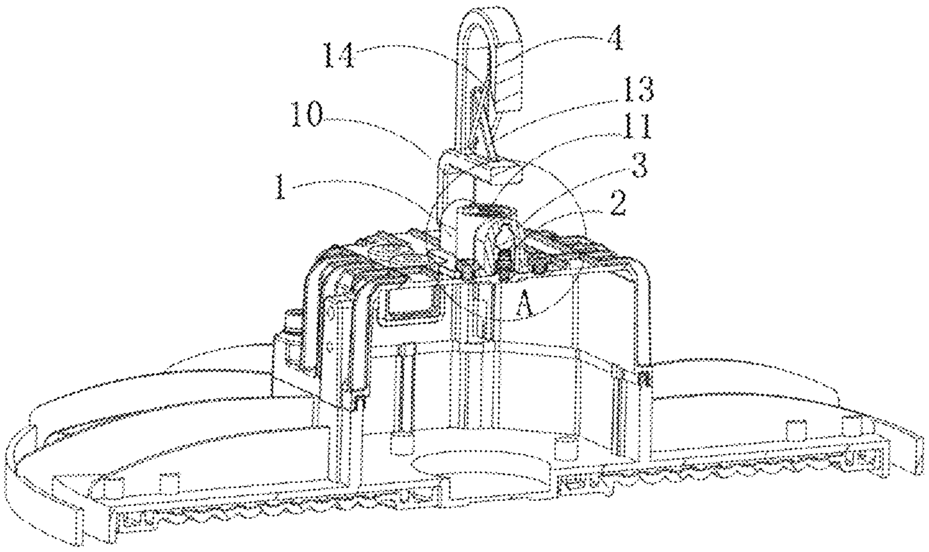
FIG. 3 illustrates a perspective view of a half lighting apparatus to show its inner structure.
Figure 4:
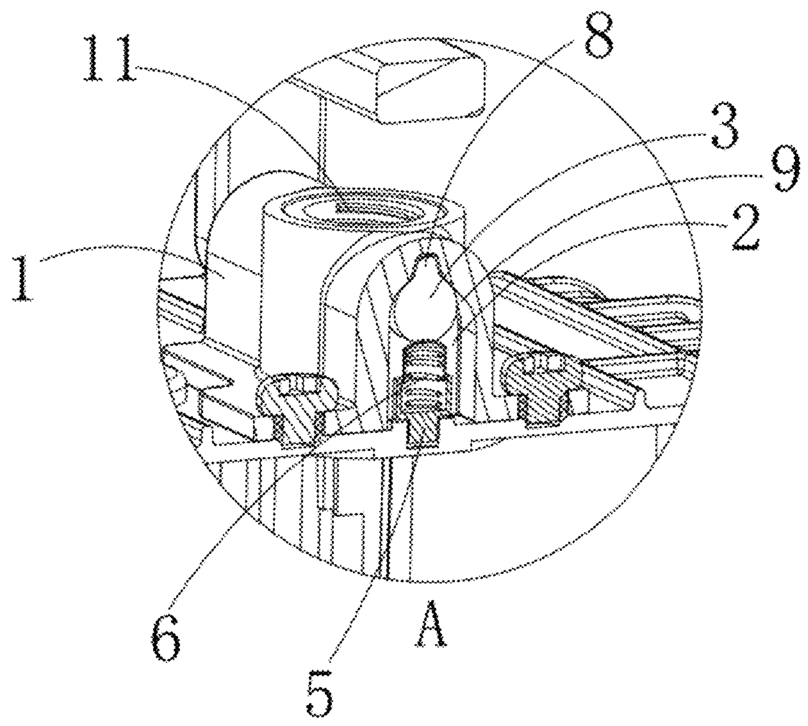
FIG. 4 illustrates a zoom-up view of a connection part for the example in FIG. 3.
Figure 5:
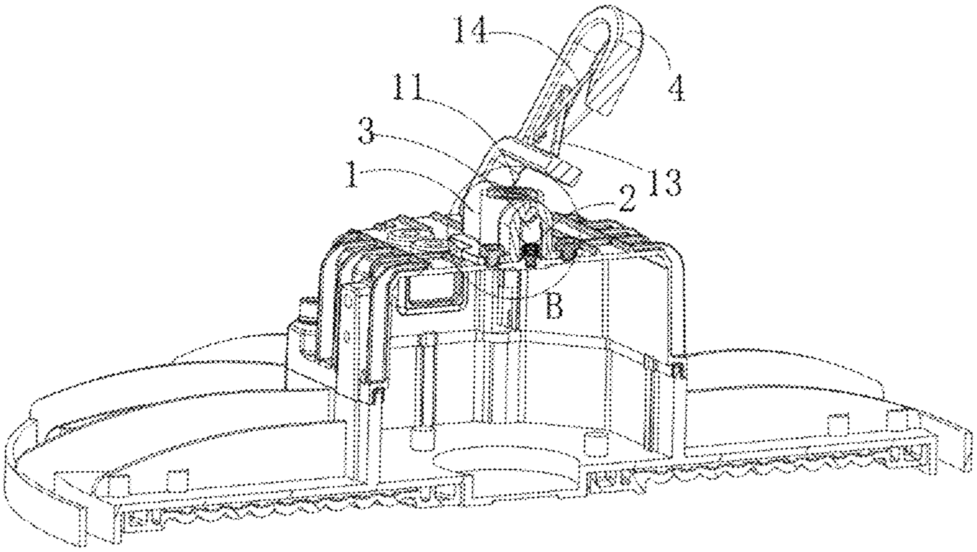
FIG. 5 illustrates another illustration of a activation of the connector.

As shown in FIGS. 3 and 4, in a further implementation, a limiting groove 7 is set on the top groove wall of the side slot 2, and a limiting block 8 is set on the side of the shaft 3. The shape of the limiting block 8 matches that of the limiting groove 7, and in the first state, the limiting block 8 is located inside the limiting groove 7.

When the shaft 3 is in the first state, the limiting is achieved in this way. The purpose of limiting is to prevent the shaft 3 from rotating, keeping the hook 4 in a vertical position, thus enabling hanging.

Specifically, a limiting groove 7 is set at the top of the side slot 2, and a limiting block 8 is set on the shaft 3. When the limiting block 8 is inserted into the limiting groove 7, the shaft 3 cannot rotate, keeping it in the first state. At this time, it needs the pushing of the elastic member. The elastic member pushes the shaft 3 upwards, pushing the limiting block 8 of the shaft 3 into the limiting groove 7. This prevents the shaft 3 from rotating, fixing it in the first state, thereby keeping the hook 4 in a vertical position, providing good stability.

As shown in FIGS. 5, 6, 7, and 8, when the shaft 3 needs to be rotated to switch states, the operator first presses down on the hook 4, driving the shaft 3 downwards, compressing the elastic member, and causing the limiting block 8 to disengage from the limiting groove 7. At this time, the hook 4 is then pushed, causing the shaft 3 to rotate 90 degrees, thereby switching the shaft 3 to the second state. At this point, the hook 4 also switches from a vertical position to a horizontal position, completing the storage. The light module and the hanging structure can then be packaged and transported as a whole.

When in the second state, if the hook 4 is released by hand, the elastic member pushes against the shaft 3 again, pressing the shaft 3 tightly against the wall of the side slot 2, which to some extent prevents the shaft 3 from rotating or swaying.

When the shaft 3 needs to be switched back to the first state, the elastic member can be pressed down again, and the shaft 3 can be rotated in the opposite direction, or the hook 4 can be directly pushed to swing, causing the shaft 3 to rotate, overcoming the elastic force in the process of rotation.

The effect of this implementation is that the limiting block 8 set on the shaft 3 and the limiting groove 7 set on the top of the side slot 2, through their mutual engagement, combined with the pushing of the elastic member, can position the shaft 3 well in the first state, thus ensuring the stable suspension of the hook 4 and guaranteeing the stability of the light module.

Figure 6:
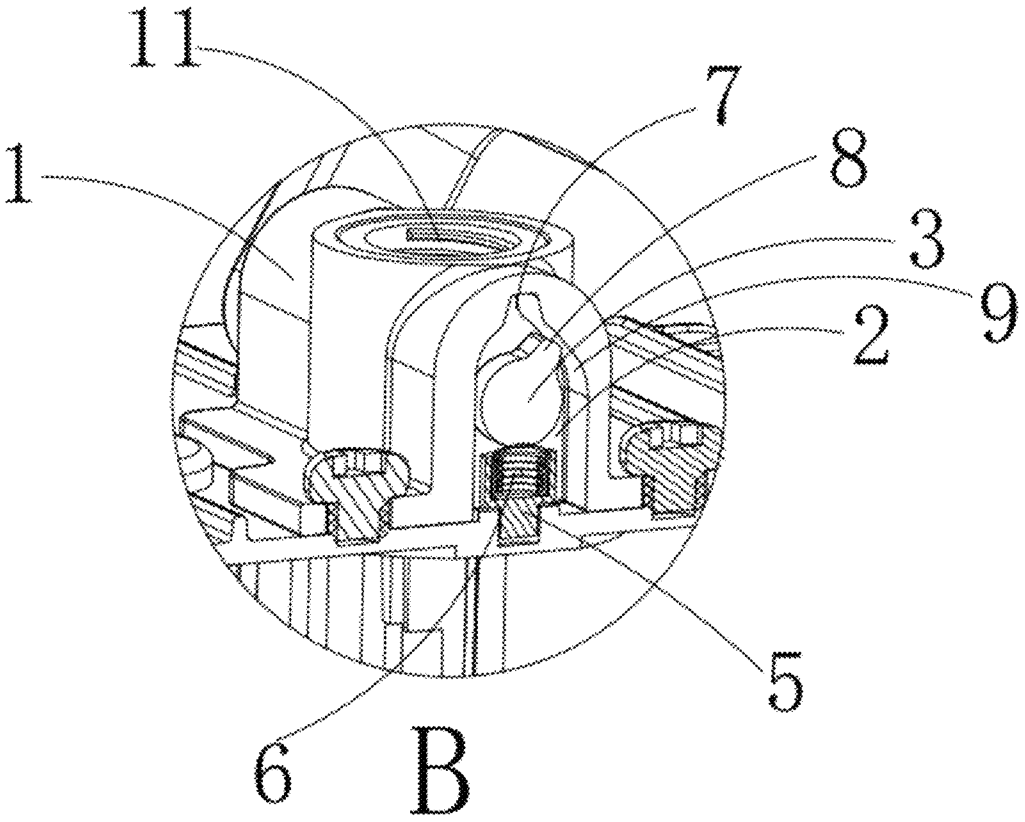
FIG. 6 illustrates a zoom-up view of a portion in the example of FIG. 5.
Figure 7:
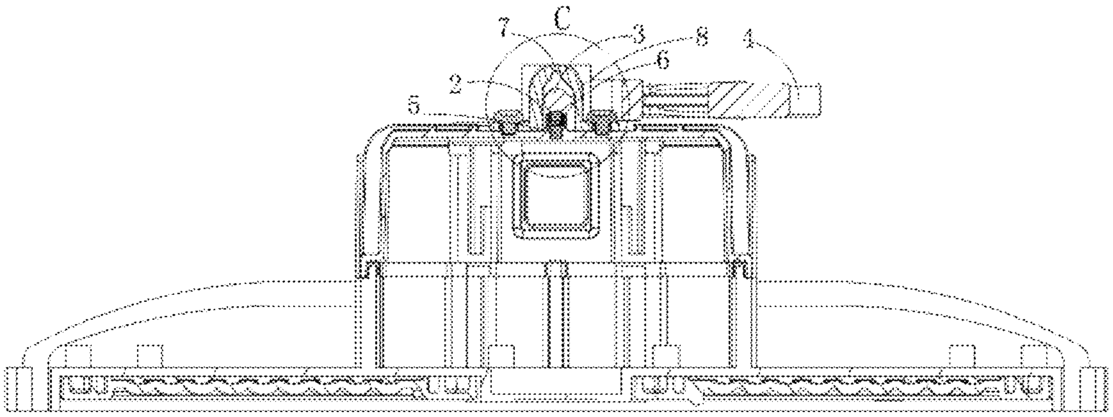
FIG. 7 illustrates a cross-sectional view of the example.

As shown in FIG. 6, furthermore, the side slot 2 walls on both sides of the limiting groove 7 are arc-shaped inner walls 9. The shaft 3 disengages the limiting block 8 from the limiting groove 7 by pressing down the elastic member, and the shaft 3 rotates to the second state with the limiting block 8 moving along the arc-shaped inner walls 9 during rotation.

Specifically, after the elastic member is compressed, the limiting block 8 disengages from the limiting groove 7. After disengagement, the shaft 3 can be rotated. During rotation, the limiting block 8 moves along the arc-shaped inner walls 9, meaning the movement trajectory of the limiting block 8 can be the same as the extension direction of the arc-shaped inner walls 9, allowing the arc-shaped inner walls 9 to guide the limiting block 8, making the movement smoother.

When the shaft 3 has rotated 90 degrees, it stops rotating. Under the action of elastic force, the shaft 3 and the limiting block 8 can press tightly against the inner wall of the side slot 2, providing a certain degree of compression positioning.

When rotating in the opposite direction to restore the first state, the limiting block 8 continues to move in the opposite direction along the arc-shaped inner walls 9. When the limiting block 8 aligns with the limiting groove 7 again, it enters the limiting groove 7 under the action of elastic force, achieving positioning.

Figure 8:
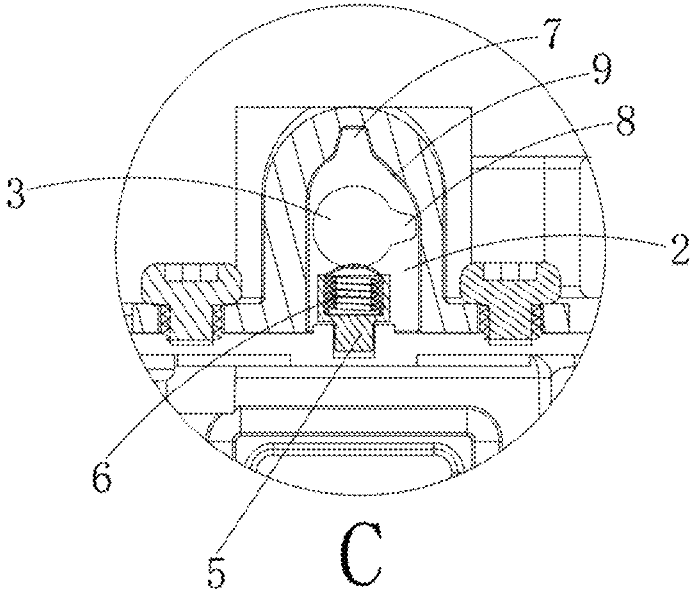
FIG. 8 illustrates a zoom-up view of the example in FIG. 7.

As shown in FIGS. 4, 6, and 8, the elastic member provided in this implementation can be specifically as follows: the elastic member includes a spring seat 5 and a first spring 6 set inside the spring seat 5. The spring seat 5 is threaded onto the light module, and the exposed end of the first spring 6 outside the spring seat 5 is used to contact the shaft 3.

Specifically, the spring seat 5 is a seat body with an accommodating cavity, which is used to accommodate the first spring 6. Part of the first spring 6 protrudes from the accommodating cavity. The spring seat 5 is installed on the light module and can be threaded. When the spring seat 5 is installed, it is in a vertical state, meaning the accommodating cavity is in a vertical state. This way, the first spring 6 is in a vertical state and can push against the shaft 3 in the vertical direction.

Specifically, the spring seat 5 can be installed at the position of the light module corresponding to the side slot 2, facilitating the pushing of the shaft 3 inside the side slot 2.

The effect of this implementation is that using the form of a spring seat 5 can achieve good fixation and positioning, making the positioning accurate. Moreover, when the first spring 6 is compressed, the spring seat 5 can still be stably fixed without tilting, providing good supporting force and effectively ensuring the pushing direction of the first spring 6.

As shown in FIGS. 10-13, in some other implementations, the elastic member can also be as follows: the elastic member includes a pushing seat 16, a second spring 17, and a pressure plate 18.

The pushing seat 16 is used to move along the height direction of the side slot 2, and its top is used to contact the shaft 3.

The second spring 17 is set vertically with its top end used to push against the pushing seat 16. The pressure plate 18 is fixedly set and is used to support the lower end of the second spring 17.

Specifically, the top of the pushing seat 16 can be arc-shaped, or have an arc-shaped groove, which can fit and contact the shaft 3 and push against it.

The pushing seat 16 can move along the height direction of the side slot 2 under the elastic force of the second spring 17, thus achieving the pressing operation on the shaft 3.

The pressure plate 18 serves to support the second spring 17, allowing the second spring 17 to be positioned accurately and maintain a stable state. Screws can also be set at the bottom of the pressure plate 18. The screws are fixedly connected to the light module and press against the pressure plate 18, keeping it stable.

Figure 9:
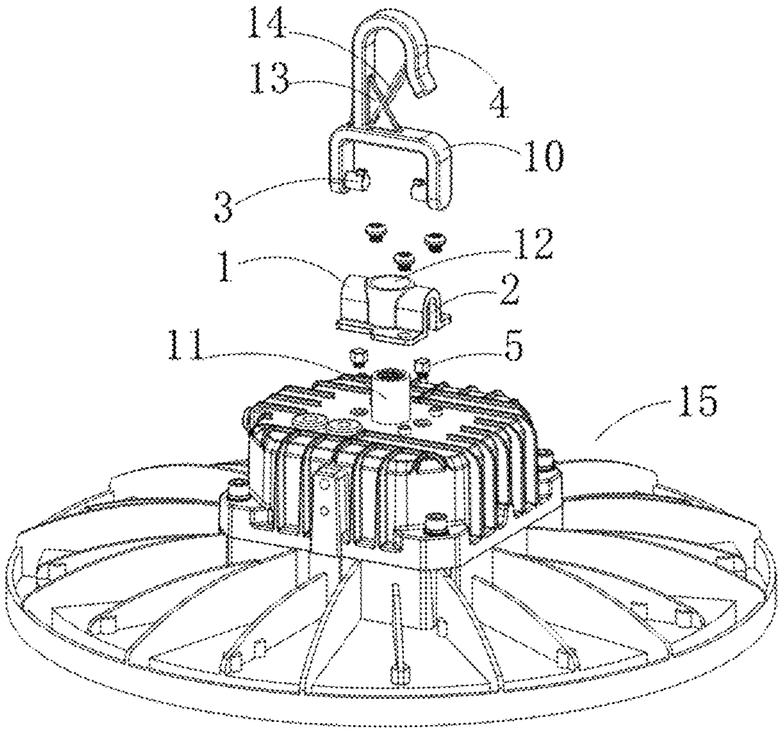
FIG. 9 illustrates an exploded view of the embodiment.
Figure 10:
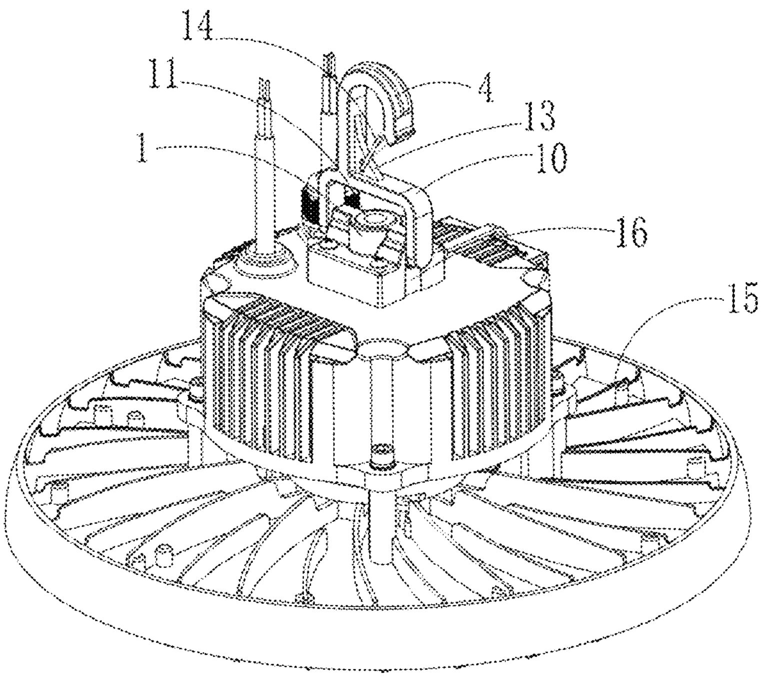
FIG. 10 illustrates another view of the lighting apparatus.
Figure 11:
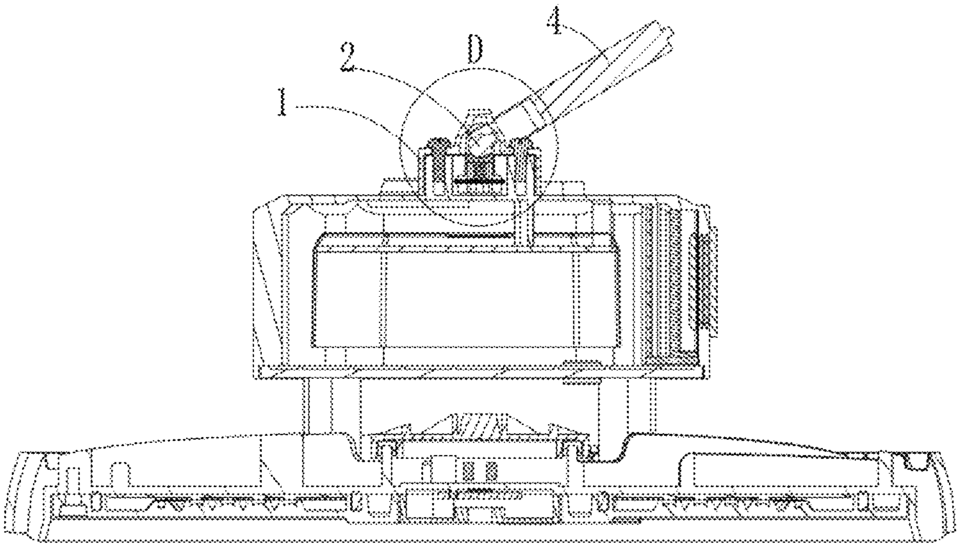
FIG. 11 illustrates a side view of the example in FIG. 10.
Figure 12:
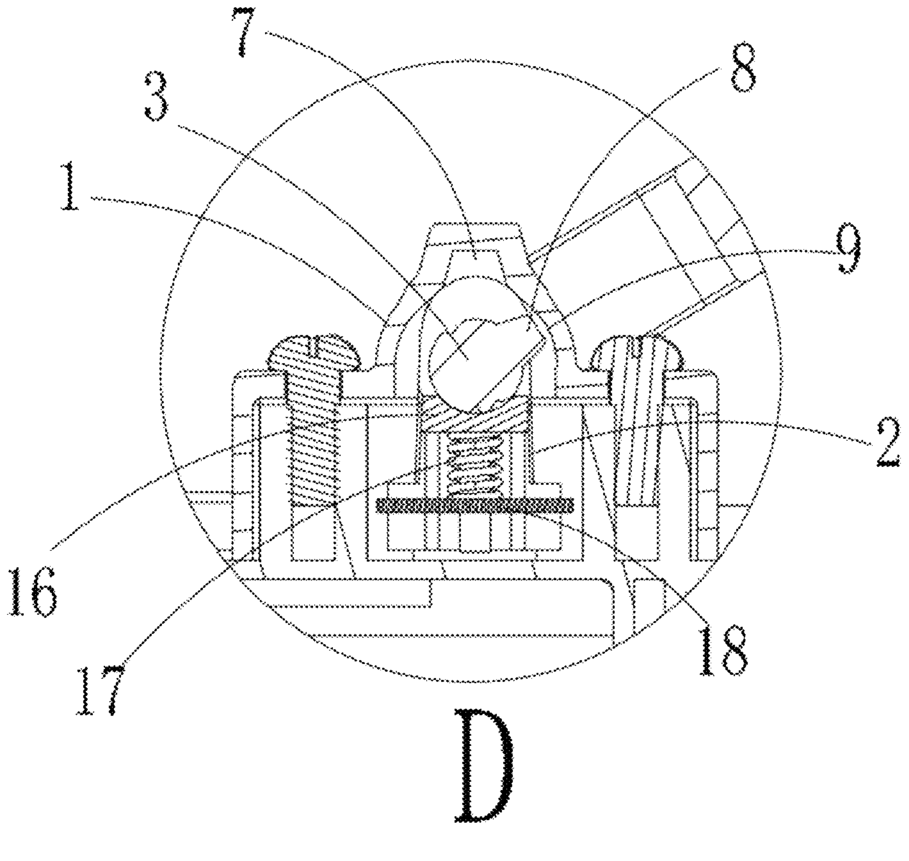
FIG. 12 illustrates a zoom-up view of a portion in the example in FIG. 11.
Figure 13:
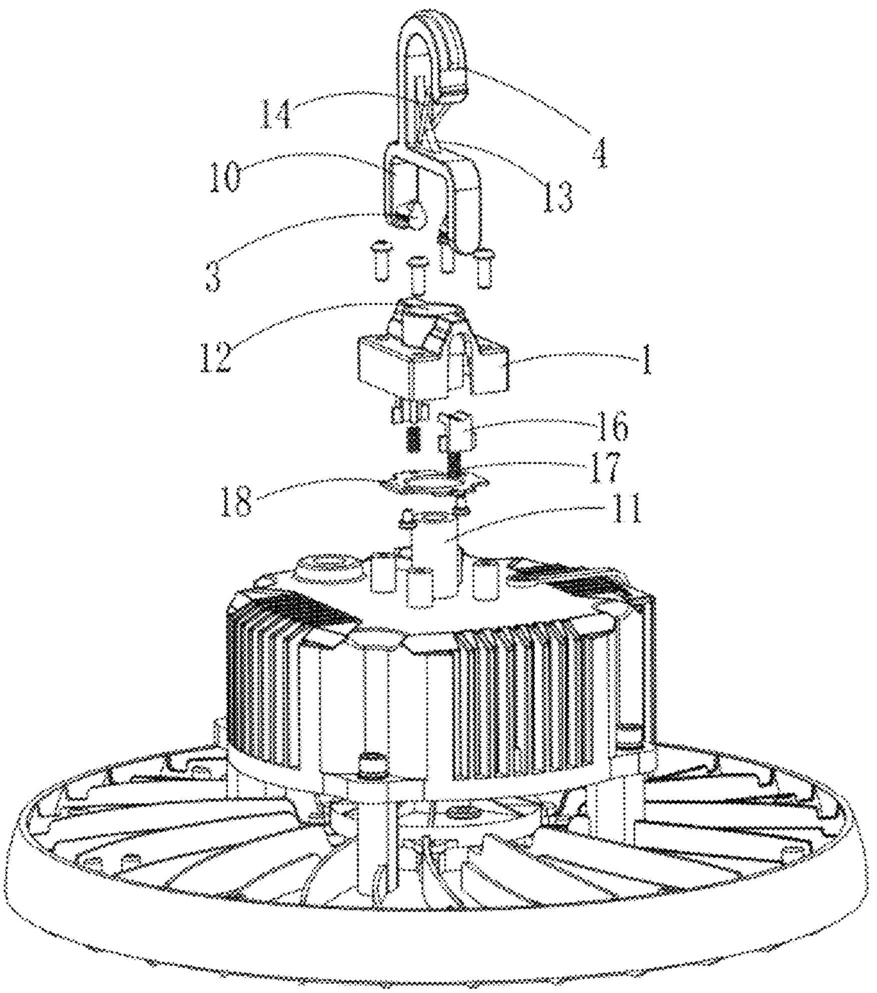
FIG. 13 illustrates an exploded view of another lighting apparatus embodiment.

As shown in FIG. 9, furthermore, side slots 2 are set on two opposite sides of the fixing member 1, and there are two shafts 3 on the hanging member. The two shafts 3 are spaced apart and set coaxially opposite each other, with each shaft 3 inserted into the side slot 2 on the corresponding side.

This implementation provides a preferred setting. To ensure the stability of the hanging member, two shafts 3 are set up, and two side slots 2 are set up. The two shafts 3 are set opposite and spaced apart from each other, each entering into a side slot 2, forming a clamping state. This can effectively ensure the stability of the hanging member and also ensure good stability during rotation.

While using two shafts 3, this implementation also provides that the hanging member includes an inverted U-shaped frame 10. The hook 4 is connected to the U-shaped frame 10, and the shafts 3 are set on the inner walls of the two opposite side bars of the U-shaped frame 10.

Specifically, the hanging member includes the hook 4, the U-shaped frame 10, and the shafts 3. The hook 4 is connected to the middle bar of the U-shaped frame 10, and the shafts 3 are connected to the opposite inner walls of the two side bars, thus forming the oppositely set shafts 3, which can form a clamping state on the fixing member 1.

As shown in FIG. 9, in this implementation, the fixing member 1 is fixedly connected to the light module. The fixing member 1 has a columnar through-hole 12, and an insertion post 11 is set on the light module. The insertion post 11 is inserted into the through-hole 12 to position the fixing member 1, and the fixing member 1 is fixedly connected to the light module by screws.

Specifically, to ensure the firmness of the connection between the fixing member 1 and the light module, the fixing member 1 is connected to the light module by screws. Threaded holes can be created on the light module. For further accurate positioning, an insertion post 11 is set up on the light module, with a corresponding through-hole 12 on the fixing member 1. The insertion post 11 passes through the through-hole 12, achieving good positioning of the fixing member 1 and effectively preventing it from swaying.

The through-hole 12 is created in the middle position between the two side slots 2, making the side slots 2 symmetrically arranged about the through-hole 12.

Figure 1:
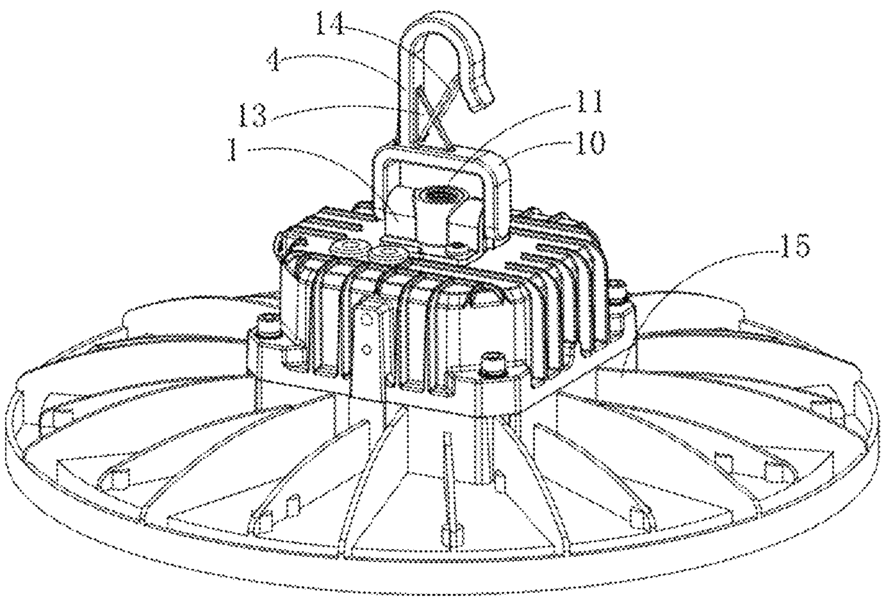
FIG. 1 illustrates a lighting apparatus embodiment.
Figure 2:
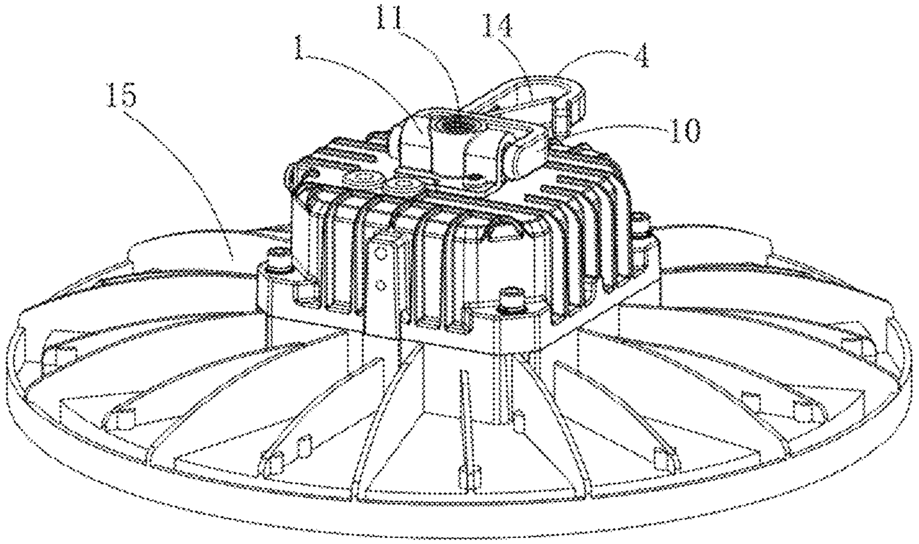
FIG. 2 illustrates another status of the example in FIG. 1.

As shown in FIG. 1, the connection form between the U-shaped frame 10 and the hook 4 provided in this implementation is direct fixed connection. Additionally, to enhance the connection strength, a reinforcing plate 13 is connected between the U-shaped frame 10 and the hook 4. The reinforcing plate 13 is triangular.

The reinforcing plate 13 is triangular in shape, allowing one edge of the plate to connect to the hook 4 and another edge to connect to the U-shaped frame 10, providing a good reinforcing connection effect.

To prevent the hook 4 provided in this implementation from unhooking during use, this implementation further sets up the following: a surrounding frame 14 is rotatably set on the reinforcing plate 13. The surrounding frame 14 is used to block the gap between the U-shaped frame 10 and the hook head of the hook 4. The surrounding frame 14 is positioned and engaged at the hook head with the aid of a torsion spring.

Specifically, when using the hook 4, it is hooked onto a ring-shaped or rod-shaped object, and then the gap is blocked by the surrounding frame 14 to prevent unhooking.

Under the action of the torsion spring, the surrounding frame 14 maintains the state of blocking the gap, i.e., the closed state. Pushing the surrounding frame 14 inward will open it, but it cannot be pushed outward, thus preventing the object inside the hook from unhooking.

The surrounding frame 14 can be a structure enclosed by rods.

This application also provides a specific implementation of an industrial and mining lamp, which is equipped with the lighting apparatus provided in any of the above implementations. Please refer to FIG. 1.

Since the industrial and mining lamp 15 provided in this implementation has this lighting apparatus, the hook 4 can be placed in a horizontal position during packaging and transportation, making packaging and transportation convenient.

In the first state the hook is in a vertical position. In the second state the hook is in a horizontal position.

The elastic member is fixedly provided on the light module. The elastic member is configured to push upward and press tightly against the shaft to maintain the shaft in the first state or the second state.

In some embodiments, a limiting groove is provided on a top slot wall of the side slot.

A limiting block is provided on a side of the shaft. The limiting block is shaped to match the limiting groove. In the first state the limiting block is located within the limiting groove.

In some embodiments, slot walls on both sides of the limiting groove in the side slot are arc-shaped inner walls.

The shaft is configured to press down the elastic member to disengage the limiting block from the limiting groove.

The shaft is configured to rotate to the second state and during rotation the limiting block moves in contact with the arc-shaped inner walls.

In some embodiments, the elastic member includes a spring seat and a first spring provided within the spring seat.

The spring seat is threadedly connected to the light module.

An exposed end of the first spring outside the spring seat is configured to contact the shaft.

In some embodiments, the elastic member includes a pushing seat, a pushing seat, a second spring and a pressure plate.

The pushing seat is configured to move along a height direction of the side slot.

A top of the pushing seat is configured to contact the shaft, a second spring.

The second spring is vertically arranged and a top end of the second spring is configured to push the pushing seat upward, a pressure plate. The pressure plate is fixedly provided. The pressure plate is configured to support a lower end of the second spring.

In some embodiments, the hanging member further includes an inverted U-shaped frame.

The hook is connected to the U-shaped frame. The shaft is provided on an inner wall of each of two opposite side bars of the U-shaped frame.

In some embodiments, the side slot is provided on two opposite sides of the fixing member.

Two shafts are provided on the hanging member. The two shafts are spaced apart and coaxially arranged opposite to each other. Each shaft is inserted into the side slot on the corresponding side.

In some embodiments, a columnar through-hole is provided on the fixing member.

An insertion post is provided on the light module. The insertion post is inserted into the through-hole to position the fixing member. The fixing member is fixedly connected to the light module by screws.

In some embodiments, a reinforcing plate is connected between the U-shaped frame and the hook.

The reinforcing plate is triangular. A surrounding frame is rotatably provided on the reinforcing plate.

The surrounding frame is configured to block a gap between the U-shaped frame and a hook head of the hook. The surrounding frame is positioned and engaged on the hook head with the aid of a torsion spring.

In FIG. 14, the light module includes a driver module 603, a light housing 6051 and a light source 6052.

A bottom side 6031 of the driver module 603 is coupled to a top surface 6053 of the light housing 6051.

The light housing 6051 has a light container 6054 for placing the light source 6052.

In FIG. 14, the driver module 603 is detachable from the light housing 6051. The fixing member 602 is fixed to the light module 605.

In some embodiments, the light housing 6051 has a track 604 for inserting the light module 605.

A lock 606 is manually operated to lock the drive module 605 to the light housing 6051 when the light module 605 is sliced to a predetermine lock position, which is at the position as FIG. 14 shows.

Figure 15A:
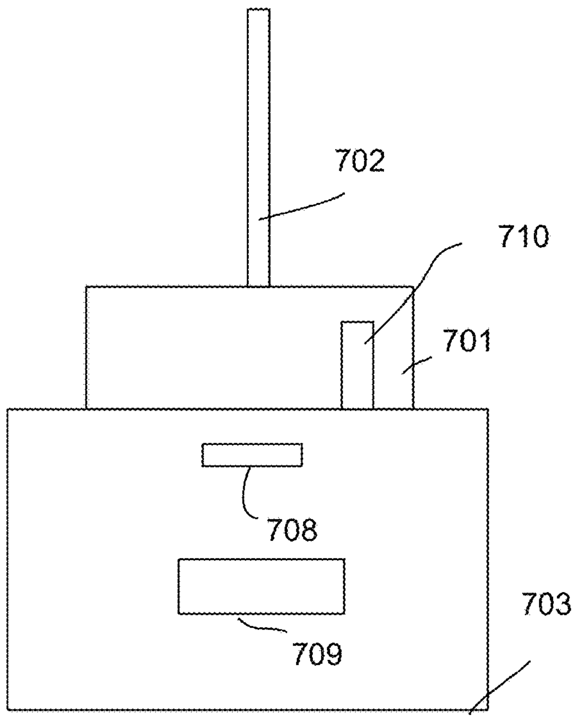
FIG. 15A and FIG. 15B illustrate a first status of a lighting apparatus embodiment.
Figure 15B:
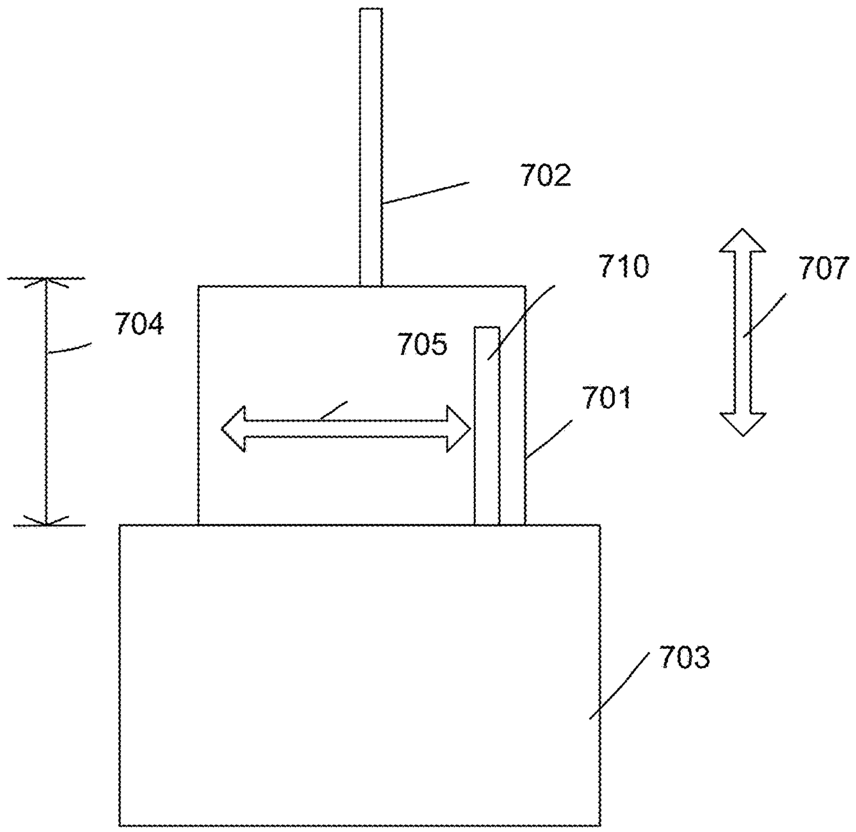

In FIG. 15A and FIG. 15B, the fixing member 701 has a dragging structure 710, like a gear structure with multiple segments for users to select one segment to stay for changing a total length 704 of the fixing member 701.

When the light module 703 is dragged to carry the fixing member 701, the fixing member 701 changes the total length under a dragging force.

When the dragging force disappears, the dragging structure 710 is kept at the total length.

In some embodiments, the fixing member has a rotation structure for changing a rotation angle 705 of the light module relative to the hanging member, which is perpendicular for the dragging direction 707.

In some embodiments, a controller 708 of the light module adjusts light parameter of a light source 709 of the light module 703 according to the rotation angle.

Figure 16:
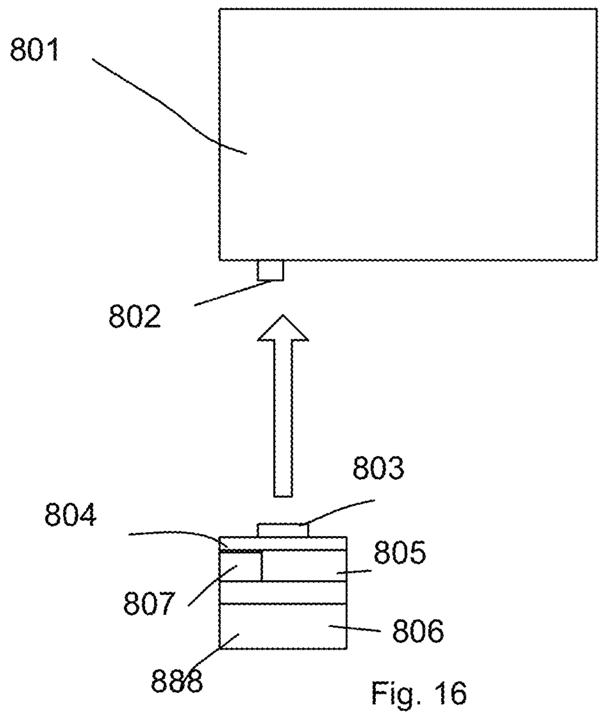
FIG. 16 illustrates an assistant light module.

In FIG. 16, the light module 801 has a socket 801 for detachably plugging an assistant light module 888.

The assistant light module 888 has a battery 807 charged via the light module 801 via the socket 802. For example, the socket 802 may be a standard charging socket like USB socket. In some other embodiments, the socket 802 may be a proprietary socket that routes a driving current to the assistant light module 888. When the light module 801 is electrically connected to a power source, the light module has a power path for charging the battery 807 of the assistant light module 888.

In some embodiments, the assistant light module 888 automatically turns on when the socket stops providing power.

In some embodiments, the assistant light module 888 has a gas sensor 805 for detecting harmful gas.

In some embodiments, the assistant light source 888 has a magnetic structure 804 to quickly attach to the socket 802 and easily to be detached from the light module 801.

In some embodiments, the assistant light module 888 has a position speaker.

Figure 17:
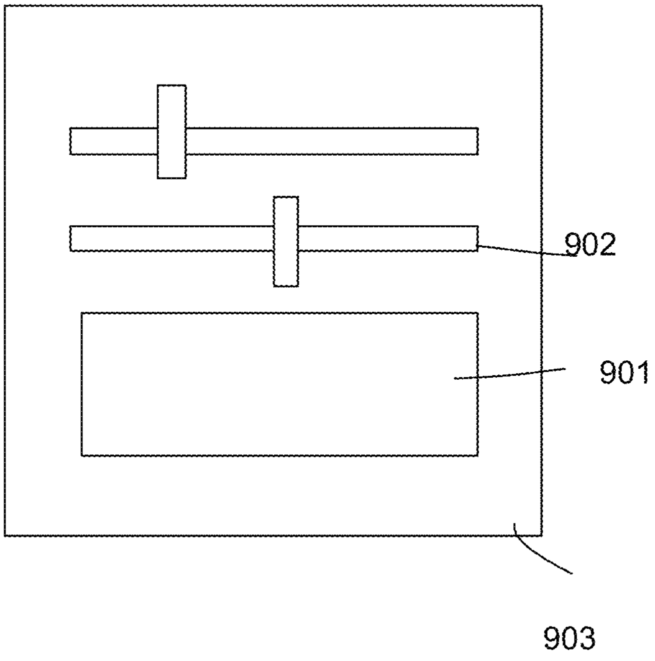
FIG. 17 shows an as a position speaker.

FIG. 17 shows such an example, the position speaker 903 has a manual switch 902 to manually adjusts to correspond to a position value. In this example, it has two switches respectively correspond to two digits that can map to different positions, e.g. 10 or 20 positions in a mining tunnel.

The position speaker 903 has a position switch to configure a position information. A speaker is controlled to generate a specific sound pattern to indicate the place the lighting apparatus is located.

When the position speaker is turned on, the position speaker generates a sound corresponding to the position information calling for help.

This is particularly helpful for the assistant light module to serve as a emergency light source while providing call-help device. In the mining tunnel, there are usually several locations, and wireless signals are usually fail to be transmitted but the vibration wave is still possible to be transmitted via the rock and detected by special detection. When the position information is decoded, it is easier to find out which position needs help. Such situation is usually related to power off and the emergency light needs to function.

In addition, the emergency is designed to be easily detached from the lighting apparatus so that users may bring the device when they go down a mining tunnel to work, set the position and start to work. If nothing goes wrong, great. But if something happens, the assistant light source may serve as an emergency light that workers can bring to find help and change its position configuration on the way to call help.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a light module;

a fixing member, wherein the fixing member is fixedly connected to the light module, wherein the fixing member is provided with a side slot;

a hanging member, wherein the hanging member is provided with a shaft, wherein the hanging member further comprises a hook, wherein the shaft is inserted into the side slot from a side, wherein the shaft is configured to rotate to be in a first state or a second state within the side slot, wherein in the first state the hook is in a vertical position, wherein in the second state the hook is in a horizontal position; and an elastic member, wherein the elastic member is fixedly provided on the light module, wherein the elastic member is configured to push upward and press tightly against the shaft to maintain the shaft in the first state or the second state, wherein the elastic member comprises a spring seat and a first spring provided within the spring seat, wherein the spring seat is threadedly connected to the light module, wherein an exposed end of the first spring outside the spring seat is configured to contact the shaft.

2. The lighting apparatus of claim 1, wherein a limiting groove is provided on a top slot wall of the side slot, wherein a limiting block is provided on a side of the shaft, wherein the limiting block is shaped to match the limiting groove, wherein in the first state the limiting block is located within the limiting groove.

3. The lighting apparatus of claim 2, wherein slot walls on both sides of the limiting groove in the side slot are arc-shaped inner walls, wherein the shaft is configured to press down the elastic member to disengage the limiting block from the limiting groove, wherein the shaft is configured to rotate to the second state and during rotation the limiting block moves in contact with the arc-shaped inner walls.

4. The lighting apparatus of claim 1, wherein the elastic member comprises: a pushing seat, wherein the pushing seat is configured to move along a height direction of the side slot, wherein a top of the pushing seat is configured to contact the shaft; a second spring, wherein the second spring is vertically arranged and a top end of the second spring is configured to push the pushing seat upward; and a pressure plate, wherein the pressure plate is fixedly provided, wherein the pressure plate is configured to support a lower end of the second spring.

5. The lighting apparatus of claim 4, wherein the hanging member further comprises an inverted U-shaped frame, wherein the hook is connected to the U-shaped frame, wherein the shaft is provided on an inner wall of each of two opposite side bars of the U-shaped frame.

6. The lighting apparatus of claim 1, wherein the side slot is provided on two opposite sides of the fixing member, wherein two shafts are provided on the hanging member, wherein the two shafts are spaced apart and coaxially arranged opposite to each other, wherein each shaft is inserted into the side slot on the corresponding side.

7. The lighting apparatus of claim 1, wherein a columnar through-hole is provided on the fixing member, wherein an insertion post is provided on the light module, wherein the insertion post is inserted into the through-hole to position the fixing member, wherein the fixing member is fixedly connected to the light module by screws.

8. The lighting apparatus of claim 7, wherein a reinforcing plate is connected between the U-shaped frame and the hook, wherein the reinforcing plate is triangular, wherein a surrounding frame is rotatably provided on the reinforcing plate, wherein the surrounding frame is configured to block a gap between the U-shaped frame and a hook head of the hook, wherein the surrounding frame is positioned and engaged on the hook head with the aid of a torsion spring.

9. The lighting apparatus of claim 1, wherein the light module comprises a driver module, a light housing and a light source, wherein a bottom side of the driver module is coupled to a top surface of the light housing, wherein the light housing has a light container for placing the light source.

10. The lighting apparatus of claim 9, wherein the driver module is detachable from the light housing, wherein the fixing member is fixed to the light module.

11. The lighting apparatus of claim 1, wherein the fixing member has a rotation structure for changing a rotation angle of the light module relative to the hanging member.

12. The lighting apparatus of claim 11, wherein a controller of the light module adjusts light parameter of a light source of the light module according to the rotation angle.

13. The lighting apparatus of claim 1, wherein the light module has a socket for detachably plugging an assistant light module, wherein the assistant light module has a battery charged via the light module via the socket.

14. The lighting apparatus of claim 13, wherein the assistant light module automatically turns on when the socket stops providing power.

15. The lighting apparatus of claim 13, wherein the assistant light module has a gas sensor for detecting harmful gas.

16. The lighting apparatus of claim 15, wherein the assistant light source has a magnetic structure to quickly attach to the socket and easily to be detached from the light module.

17. The lighting apparatus of claim 13, wherein the assistant light module has a position speaker, wherein the position speaker has a position switch to configure a position information, wherein when the position speaker is turned on, the position speaker generates a sound corresponding to the position information calling for help.

* * * * *